US012688673B2

(12) United States Patent (10) Patent No.: US 12,688,673 B2
Chao et al. (45) Date of Patent: Jul. 21, 2026

(54) METHOD AND SYSTEM FOR IMAGE RECOGNITION AND COMPUTER READABLE STORAGE MEDIUM

(71) Applicant: Wistron Medical Technology Corporation, Hsinchu City (TW)

(72) Inventors: Yi Sheng Chao, Hsinchu City (TW);
Shih Feng Huang, Hsinchu City (TW);
Chao Yi Huang, Hsinchu City (TW);
Han Chun Kuo, Hsinchu City (TW)

(73) Assignee: Wistron Medical Technology Corporation, Hsinchu City (TW)

( * ) Notice: Subject to any disclaimer, the term of this patent is extended or adjusted under 35 U.S.C. 154(b) by 264 days.

(21) Appl. No.: 18/490,768

(22) Filed: Oct. 20, 2023

(65) Prior Publication Data

US 2025/0104395 A1 Mar. 27, 2025

(30) Foreign Application Priority Data

Sep. 26, 2023 (TW) ................................. 112136875

(51) Int. Cl.
*G06K 9/00* (2022.01)
*G06T 7/00* (2017.01)
(Continued)

(52) U.S. Cl.
CPC .......... *G06V 10/764* (2022.01); *G06T 7/0012* (2013.01); *G06T 7/70* (2017.01);
(Continued)

(58) Field of Classification Search
CPC . G06T 2207/10056; G06T 2207/20021; G06T 2207/20081; G06T 2207/30024;
(Continued)

(56) References Cited

U.S. PATENT DOCUMENTS 10,936,911 B2 * 3/2021 Attorre ............... G06F 18/2148
11,544,851 B2 * 1/2023 Wainrib ................ G06T 7/0014
(Continued)

FOREIGN PATENT DOCUMENTS

CN 110517771 11/2019
CN 108647732 7/2020

OTHER PUBLICATIONS

Yang, Huan, et al. "Deep learning-based six-type classifier for lung cancer and mimics from histopathological whole slide images: a retrospective study." BMC medicine 19.1 (2021): 80. (Year: 2021).*

*Primary Examiner* — Hadi Akhavannik
(74) *Attorney, Agent, or Firm* — JCIPRNET

(57) ABSTRACT

A method and a system for image recognition and a computer readable storage medium are provided. The method includes: obtaining an image to be recognized; cutting the image to be recognized into multiple tiles, wherein a size of each of the tiles conforms to a preset size; inputting the tiles into a trained artificial intelligence model respectively; obtaining multiple judgment results of the tiles, wherein each of the judgment results includes a specified category in which the corresponding tile is classified into multiple categories; and storing the judgment results as a structured report to be output to a digital pathology platform.

19 Claims, 3 Drawing Sheets

(51) Int. Cl.

| | | |
|---|---|---|
| *G06T 7/70* | (2017.01) | |
| *G06V 10/26* | (2022.01) | |
| *G06V 10/764* | (2022.01) | |
| *G06V 10/774* | (2022.01) | |
| *G06V 10/80* | (2022.01) | |

(52) U.S. Cl.

CPC ............ *G06V 10/26* (2022.01); *G06V 10/774* (2022.01); *G06V 10/809* (2022.01); *G06T 2207/20081* (2013.01); *G06T 2207/30096* (2013.01); *G06V 2201/03* (2022.01)

(58) Field of Classification Search

CPC ......... G06T 2207/30096; G06T 7/0012; G06T 7/70; G06V 10/26; G06V 10/764; G06V 10/774; G06V 10/809; G06V 10/82; G06V 2201/03

See application file for complete search history.

(56) References Cited

U.S. PATENT DOCUMENTS

| | | | | |
|---|---|---|---|---|
| 2019/0295252 A1* | 9/2019 | Fuchs | ................... | G06F 18/217 |
| 2020/0211189 A1* | 7/2020 | Yip | ........................ | G06V 20/69 |
| 2020/0272864 A1* | 8/2020 | Faust | ................... | G06V 10/764 |
| 2021/0233238 A1* | 7/2021 | Yip | ........................ | G06V 10/82 |
| 2021/0249118 A1* | 8/2021 | Papagiannakis | ....... | G16H 50/30 |
| 2022/0084660 A1* | 3/2022 | Georgescu | ............ | G16H 30/20 |
| 2022/0237777 A1* | 7/2022 | Kim | ....................... | G16H 50/20 |
| 2023/0024468 A1* | 1/2023 | Robert | ................ | G06V 10/774 |

\* cited by examiner

Obtain an image to be recognized ~S205

Cut the image to be recognized into multiple tiles ~S210

Respectively input the tiles into a trained artificial intelligence module, and respectively obtain multiple judgment results of the tiles ~S215

Store the judgment results as a structured report to be output to a digital pathology platform ~S220

METHOD AND SYSTEM FOR IMAGE RECOGNITION AND COMPUTER READABLE STORAGE MEDIUM

CROSS-REFERENCE TO RELATED APPLICATION

This application claims the priority benefit of Taiwan application serial no. 112136875, filed on Sep. 26, 2023. The entirety of the above-mentioned patent application is hereby incorporated by reference herein and made a part of this specification.

BACKGROUND

Technical Field

The invention relates to a computer vision technology, and particularly relates to a method and a system for image recognition and a computer readable storage medium.

Description of Related Art

Along with development science and technology, technologies such as automatic image analysis, artificial intelligence (AI), etc., have been widely integrated into various pathological medical systems. However, there is no integration method for AI applications that exist in various pathological medicine systems, which makes it difficult for AI solutions to integrate services into non-standardized software systems of pathological medicine.

In addition, resolutions of digital imaging and communications in medicine (DICOM) format images produced by various digital pathology scanners are very obviously different. For example: a resolution of a DICOM image generated by a Roche digital pathology scanner is 1280×1280; a resolution of a DICOM image generated by a 3DHISTECH digital pathology scanner is 1024×1024. For AI models, different image resolutions may cause AI model compatibility issues.

In addition, to input high-resolution DICOM images may also increase errors and is lack of details in AI model inference. Moreover, the high-resolution DICOM images are huge, and for the AI model, the inference of each image not only requires a large amount of hardware resources (for example, a central processing unit (CPU), a graphic processing unit (GPU), a memory capacity, a hard disk space, etc.), but also requires a lot of time to perform calculations. For example, the AI model takes more than 10 minutes to infer an image with a size of 1G. Therefore, it is very impractical and unproductive for busy pathologists to spend too much time waiting for the AI model to make inferences.

SUMMARY

The invention provides a method and a system for image recognition and a computer readable storage medium, which may improve image recognition accuracy and reduce a burden on hardware resources.

The invention provides a method for image recognition, which includes the following. An image recognition process is executed by a processor. The image recognition process includes the following. An image to be recognized is obtained. The image to be recognized is cut into multiple tiles. A size of each of the tile conforms to a preset size. The tiles are respectively input into a trained artificial intelligence model. Multiple judgment results of the tiles are respectively obtained. Each of the judgment results includes a specified category in which the corresponding tile is classified into a plurality of categories. The judgment results are stored as a structured report to be output to a digital pathology platform.

In an embodiment of the invention, the step of obtaining the image to be recognized includes the following. The image to be recognized is obtained from an image server in response to receiving an inference request from the digital pathology platform.

In an embodiment of the invention, the method further includes the following. The image recognition process is regularly executed based on a preset time, or the image recognition process is executed in response to a trigger event.

In an embodiment of the invention, the image recognition process further includes the following. After the image to be recognized is obtained, and before the image to be recognized is cut, a format of the image to be recognized is converted into a specified format.

In an embodiment of the invention, the step of storing the judgment results as the structured report includes the following. The judgment results of the tiles cut from the image to be recognized are combined to obtain an inference result corresponding to the image to be recognized. The inference result is stored as the structured report. In an embodiment of the invention, each of the judgment results further includes regional coordinate information. In the step of combining the judgment results of the tiles cut from the image to be recognized to obtain the inference result corresponding to the image to be recognized, a lesion area corresponding to the image to be recognized is obtained based on the multiple regional coordinate information in the judgment results, and a lesion level corresponding to the image to be recognized is determined based on the specified categories in the tiles.

In an embodiment of the invention, the image recognition process further includes the following. The image to be recognized is displayed in the digital pathology platform in a form of a heat map based on the inference result. Multiple pixels included in a recognized lesion area in the image to be recognized are represented by a first color, and multiple pixels not included in the lesion area are represented by a second color.

In an embodiment of the invention, the method further includes the following. A training process is executed on the artificial intelligence model by the processor. The training process includes the following. Multiple training images and annotation content corresponding to each of the training images are obtained. Each of the training images is cut into multiple training tiles. A size of each of the training tiles conforms to the preset size. The training tiles cut from each of the training images are classified into the categories based on the annotation content corresponding to each of the training images. The training tiles corresponding to the categories are input into the artificial intelligence model for training.

In an embodiment of the invention, the training images include multiple pathological images, and the annotation content of each of the pathological images includes location information of a pathological area and a pathological label of the pathological area. In the step of classifying the training tiles cut from each of the training images into the categories based on the annotation content corresponding to each of the training images, it is determined whether each of the training tiles covers at least a part of the pathological area, the training tiles covering at least a part of the pathological area are classified into a pathology category corresponding to the pathological label, in which the pathology category is one of the categories, and the training tiles that do not cover at least a part of the pathological area are classified to a no-lesion category, in which the no-lesion category is one of the categories.

The invention provides an artificial intelligence system for image recognition, which includes a storage device storing a trained artificial intelligence model, and a processor coupled to the storage device and configured to execute the method for image recognition.

The invention provides a computer readable storage medium, which stores multiple program instructions, and the program instructions are loaded through an electronic device to execute the method for image recognition.

Based on the above descriptions, in the invention, the image input to the artificial intelligence model is cut into multiple tiles with a uniform size. Accordingly, a speed of the artificial intelligence model loading the tiles is increased, and a burden on hardware resources is reduced. Moreover, the invention may increase a number of samples of the training images, and training may be performed without requiring large and expensive hardware information.

DESCRIPTION OF THE EMBODIMENTS

Figure 1:
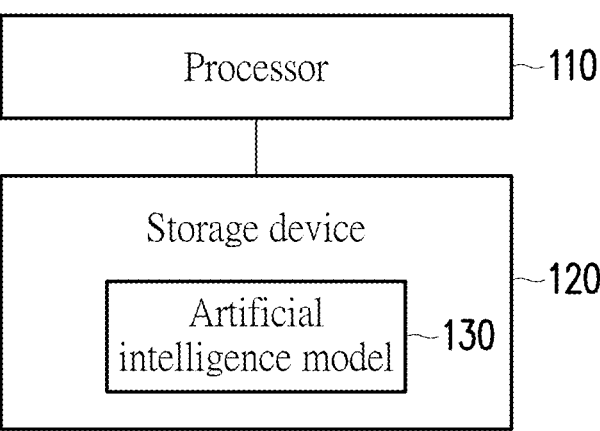
FIG. 1 is a block diagram of an artificial intelligence system according to an embodiment of the invention.

FIG. 1 is a block diagram of a system for image recognition according to an embodiment of the invention. Referring to FIG. 1, the system for recognition image includes a processor 110 and a storage device 120. The processor 110 is coupled to the storage device 120. The storage device 120 includes artificial intelligence (AI) model 130.

The processor 110 is, for example, a central processing unit (CPU), a graphics processing unit (GPU), a physical processing unit (PPU), or a programmable microprocessor, an embedded control chip, a digital signal processor (DSP), an application specific integrated circuit (ASIC) or other similar devices.

The storage device 120 is, for example, any type of a fixed or removable random access memory (RAM), a read-only memory (ROM), a flash memory, a hard drive or other similar devices or a combination of these devices. The storage device 120 further includes one or more program instructions, and after the program instructions are loaded, the processor 110 may execute an image recognition process. In addition, before executing the image recognition process, the processor 110 may first execute a training process of the AI model 130, and then use the trained AI model 130 to perform image recognition. The AI model 130 is, for example, created by using an efficient network algorithm.

Figure 2:
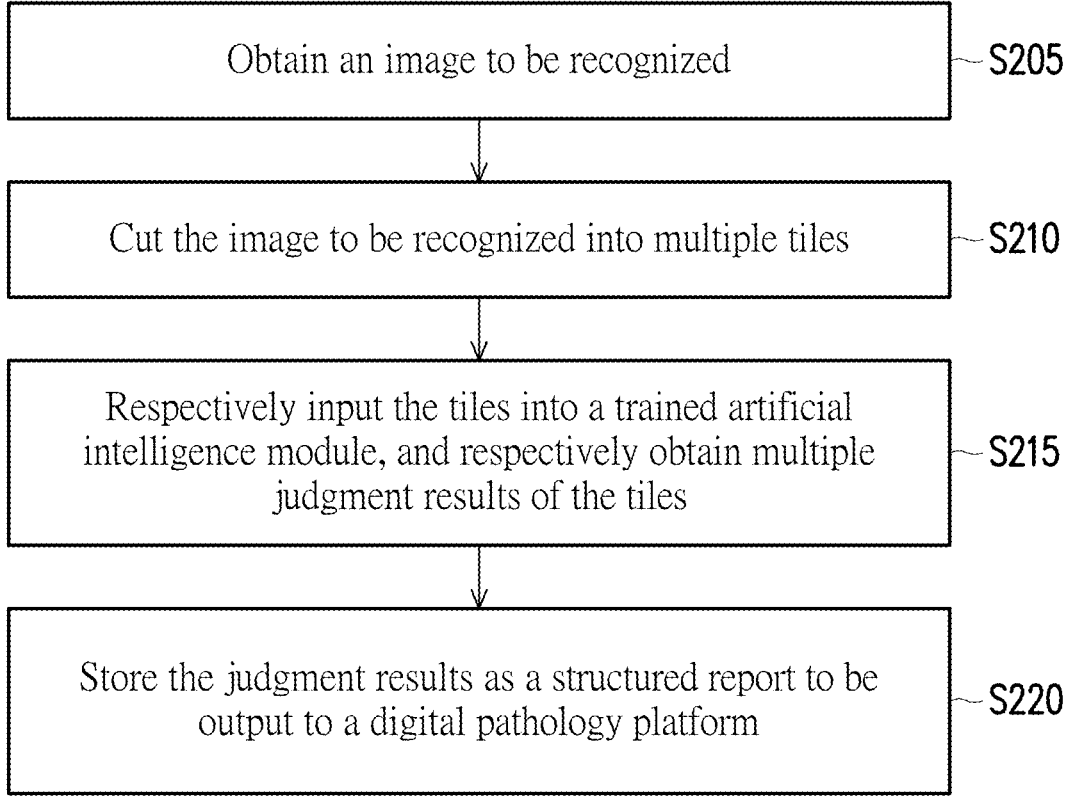
FIG. 2 is a flowchart of a method for image recognition according to an embodiment of the invention.

FIG. 2 is a flowchart of a method for image recognition according to an embodiment of the invention. Refer to FIG. 1 and FIG. 2 at the same time, in step S205, the processor 110 obtains the image to be recognized. Then, in step S210, the processor 110 cuts the image to be recognized into multiple tiles. Here, a size of each tile conforms to a preset size. The preset size is, for example, 512×512. Then, in step S215, the processor 110 respectively inputs the tiles to the trained AI model, and respectively obtains multiple judgment results of the tiles. Each judgment result includes a specified category in which the corresponding tile is classified into multiple categories.

After the AI model performs inference, a classification result (specified category) is obtained, if further analysis is needed, an output value of a Softmax function that determines the classification may be reviewed, and such value may be regarded as a confidence value (containing a probability component), and usually the highest value determines which category it is classified into.

Then, in step S220, the processor 110 stores the judgment results as a structured report and outputs the judgment results to a digital pathology platform. Specifically, the processor 110 combines the judgment results of the tiles cut from the image to be recognized to obtain an inference result corresponding to the image to be recognized, and stores the inference result as the structured report.

Figure 3:
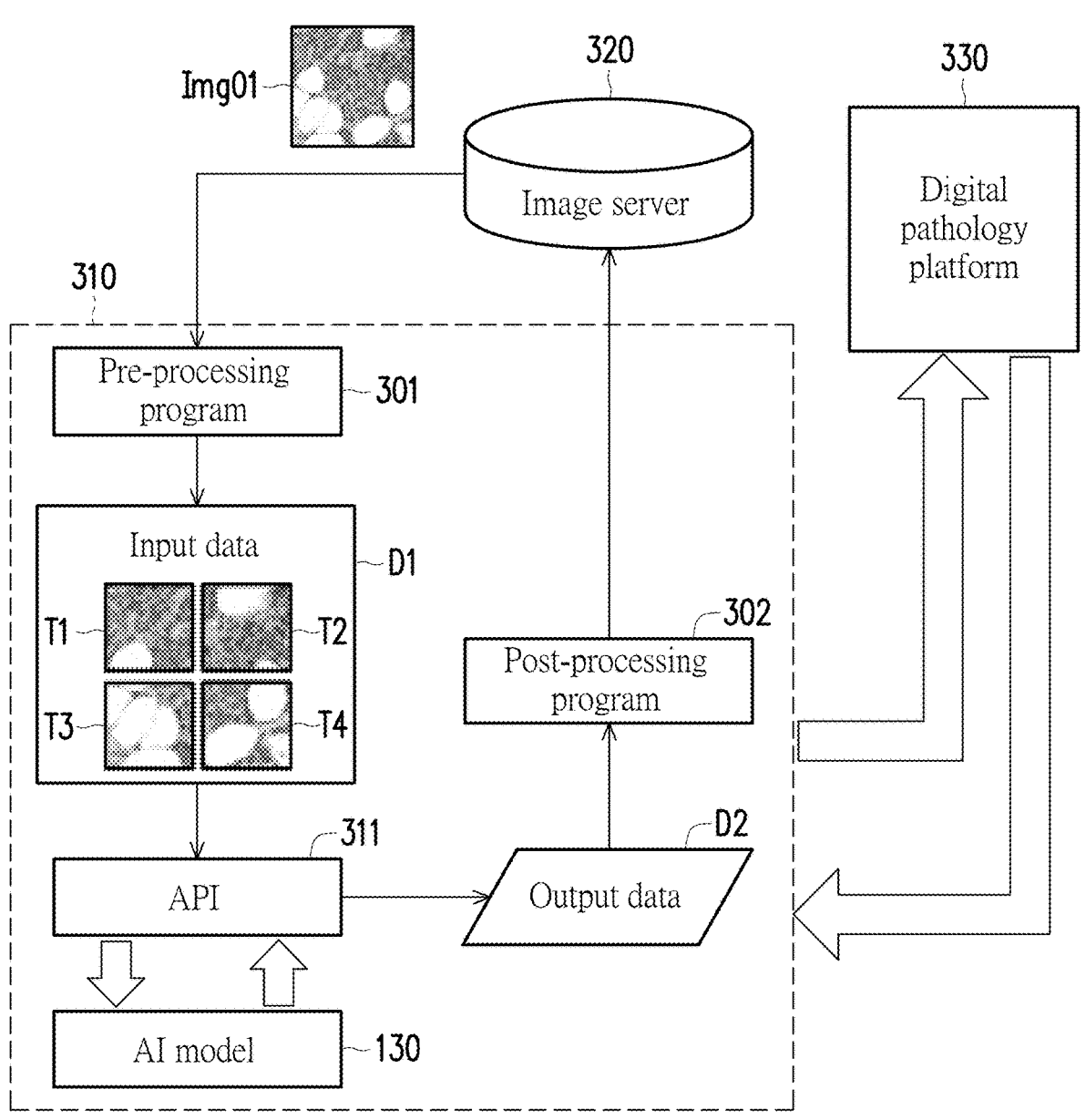
FIG. 3 is a schematic diagram of a framework of an AI system according to an embodiment of the invention.

FIG. 3 is a schematic diagram of a framework of an AI system according to an embodiment of the invention. Referring to FIG. 3, the framework includes an AI service application 310, an image server 320 and a digital pathology platform 330. The AI service application 310 may, for example, be provided in the storage device 120 and executed by the processor 110. The image server 320 is used to store and manage digital pathological images. A format of the digital pathological image is a digital imaging and communications in medicine (DICOM) format. The digital pathology platform 330 is an online service platform that provides doctors with functions such as film reading, report issuing, international medical treatment, multi-specialty conference, etc.

In an embodiment, a physician may send an inference request to the AI service application 310 through an image viewing page provided by the digital pathology platform 330. The AI service application 310 executes an image recognition process after receiving the inference request, and transmits the inference result back to the digital pathology platform 330, and the physician may use the inference result returned by the AI service application 310 to assist diagnosis.

In another embodiment, the AI service application 310 may execute the image recognition process regularly based on a preset time. For example, the AI service application 310 may be set to start the image recognition process for the digital pathological images at 12:00 midnight every day.

Alternatively, in another embodiment, the AI service application 310 executes the image recognition process in response to a trigger event. For example, each time when the image server 320 receives a new pathological image, the image server 320 immediately notifies the AI service application 310 to perform the image recognition process.

The AI service application 310 reads an image to be recognized Img01 from the image server 320, and then executes a pre-processing program 301 on the image to be recognized Img01. In the pre-processing program 301, the format of the image to be recognized Img01 is converted into a specified format. The specified format is, for example, one of a JPEG (Joint Photographic Experts Group) format, a PNG (Portable Network Graphics) format, and a TIFF (Tagged Image File Format). After converting the format of the image to be recognized Img01, the image to be recognized Img01 is cut into multiple tiles. For example, it is assumed that a resolution of the image to be recognized Img01 is 1024×1024, and it is cut into four 512×512 tiles T1-T4. In addition, before cutting the image to be recognized Img01, the pre-processing program 301 further includes deleting a white background in the image to be recognized Img01.

After the pre-processing program 301 is completed, the AI service application 310 inputs the tiles T1-T4 to the AI model 130 as input data D1. Here, the AI model 130 provides an application programming interface (API) 311. The API 311 is, for example, a representational state transfer (REST) API, which is in charge of transmitting the input data D1 to the AI model 130 and sending output data D2 of the AI model 130.

In an embodiment, an AI model may be used to identify multiple lesions. Each cut tile is input to the AI model 130 for interpretation to identify a lesion area and a specified category thereof in each tile. The AI model 130 may perform interpretation according to different lesion categories (for example, breast cancer, thyroid cancer, oral cancer, etc.) and obtain a judgment result of each tile, and take these judgment results as the output data D2 and send the same to a post-processing (post-processing) 302.

In the post-processing program 302, the AI service application 310 combines the judgment results in the output data D2 to obtain an inference result corresponding to the image to be recognized Img01. Thereafter, the inference result is stored in the DICOM SR format.

Specifically, each judgment result further includes regional coordinate information in addition to the specified category. The AI service application 310 obtains a lesion area corresponding to the image to be recognized Img01 based on multiple regional coordinate information in these judgment results. For example, based on these regional coordinate information, pathological areas found in all of the judgment results are combined into a complete pathological area. Moreover, the AI service application 310 obtains multiple corresponding graphic data based on multiple pieces of regional coordinate information, and obtains lesion graphic data corresponding to the lesion area of the image to be recognized Img01. The AI service application 310 determines a lesion level corresponding to the image to be recognized Img01 based on multiple specified categories. For example, if the 4 specified categories corresponding to 4 tiles include 4 breast cancer categories, the lesion level is determined to be 4; if there are 3 breast cancer categories and 1 no-lesion category, the lesion level is determined to be 3; if there are 2 breast cancer categories and 2 no-lesion categories, the lesion level is determined to be 2; if there is 1 breast cancer category and 3 no-lesion categories, the lesion level is determined to be 1. This is only an example and the invention is not limited thereto.

In another embodiment, multiple AI models may also be used to identify lesions, for example, one AI model is used to identify one type of lesion. The AI model 130 may perform interpretation according to different lesion level categories (for example, cancer in situ, early stage cancer, intermediate stage cancer, late stage cancer, etc.), and obtain the judgment results of each tile, and take these judgment results as the output data D2, and sent the same to the post-processing program 302.

The AI service application 310 determines a lesion level based on the specified category obtained from each tile, i.e., based on a number of cancers in situ, early stage cancers, intermediate stage cancers, late stage cancers, etc., calculated based on the specified categories corresponding to multiple tiles cut from the same image to be recognized. For example, the 4 specified categories include 4 late stage cancers and the lesion level is the highest; the 4 specified categories include 4 cancers in situ and the lesion level is the lowest.

The AI service application 310 uploads the inference results converted into the DICOM SR format to the image server 320. Moreover, the AI service application 310 may further transmit the inference result to the digital pathology platform 330 in the REST API manner. Accordingly, a pathologist may view the inference result of the AI model 130 through an image viewing page and assist in diagnosis.

In addition, the AI service application 310 may also display the image to be recognized Img01 in the digital pathology platform 330 in a form of a heat map based on the inference result. For example, multiple pixels included in the recognized lesion area in the image to be recognized Img01 are represented by a first color, and multiple pixels not included in the lesion area are represented by a second color.

Figure 4:
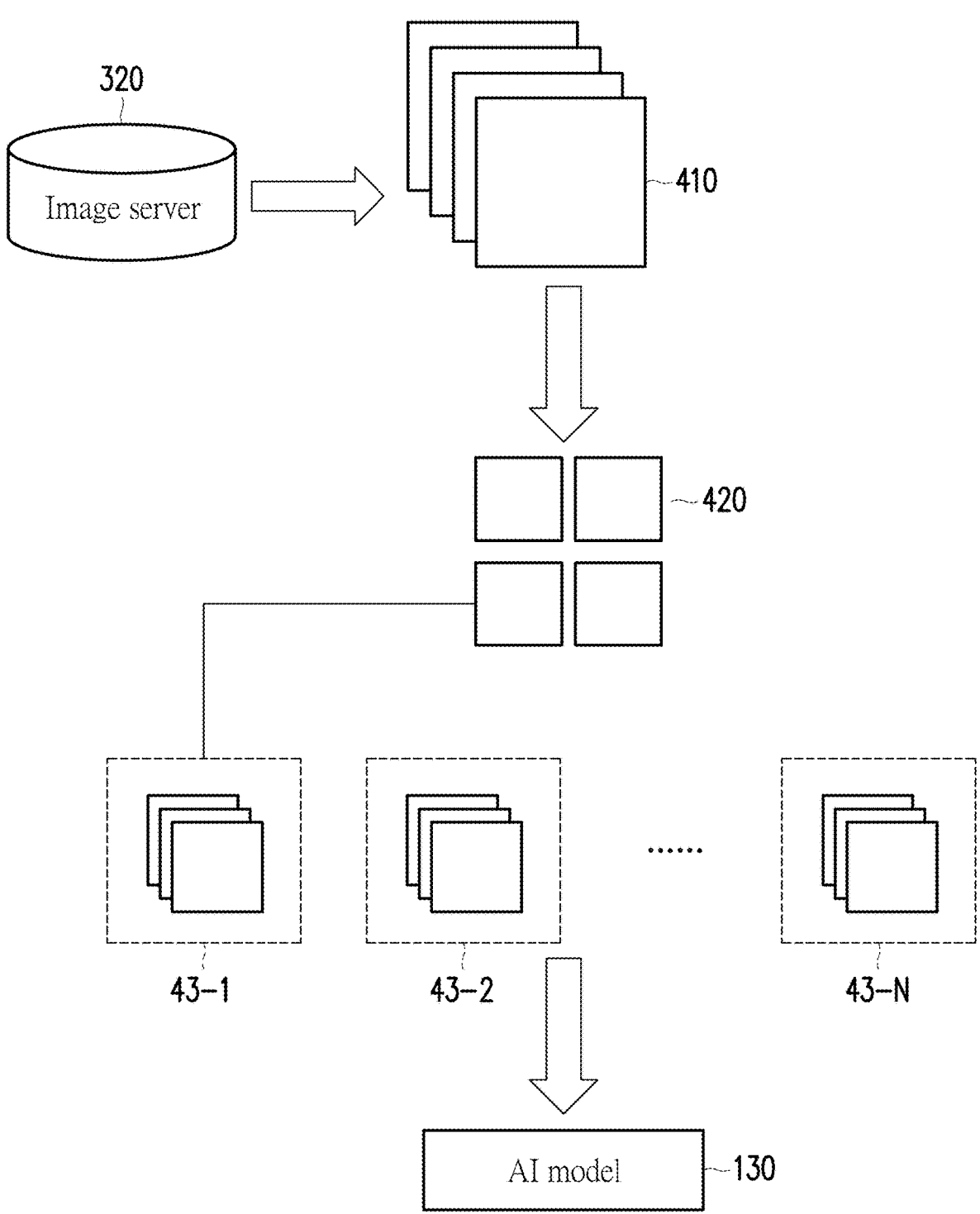
FIG. 4 is a schematic diagram of a framework of a training process of an AI model according to an embodiment of the invention.

FIG. 4 is a schematic diagram of a framework of a training process of the AI model according to an embodiment of the invention. The training process of the embodiment may be implemented by the processor 110. Referring to FIG. 4, multiple training images 410 and annotation content corresponding to each training image 410 are obtained from the image server 320. Then, each training image and the annotation content corresponding to each training image are cut into multiple training tiles 420. Here, a size of each training tile conforms to the preset size (for example, 512×512). Then, based on the annotation content corresponding to each training image 410, the training tiles 420 cut from each training image 410 are classified into one of categories 43-1 to 43-N.

For example, the training images 410 are pathological images, and the annotation content of each pathological image includes location information of the pathological area and a pathological label of the pathological area. After cutting the pathological image into multiple training tiles, it is determined whether each training tile covers at least a part of the pathological area. The training tiles that cover at least a part of the pathological area are classified into a pathology category (for example, category 43-2) corresponding to the pathological label, and the training tiles that do not cover at least a part of the pathological area are classified into a no-lesion category (for example, category 43-1).

After all training tiles cut from all training images 410 are classified, multiple training tiles included in each of the categories 43-1 to 43-N are input to the AI model 130 for training. Multiple categories are set in the AI model 130 for training.

In an application example, physicians may use a locally deployed platform to use services provided by the AI service application 310 in their daily workflow through the AI service application 310.

In summary, the image input to the AI model is cut into multiple tiles with a uniform size. Accordingly, a speed of the AI model loading the tiles is increased, and a burden on hardware resources is reduced. Moreover, the invention may increase a number of samples of the training images, and training may be performed without requiring large and expensive hardware information.

Through the above embodiments, interoperability different from existing digital pathology software systems may be achieved, which reduces an integration effort of software development, and users will benefit from a wider variety of AI models and faster access to new innovations. In addition, the invention may reduce barriers to market entry for AI service applications and provide physicians with advanced AI tools.

What is claimed is:

1. A method for image recognition, comprising: executing an image recognition process by a processor, wherein the image recognition process comprises:

obtaining an image to be recognized;

cutting the image to be recognized into a plurality of tiles, wherein a size of each of the tiles conforms to a preset size;

respectively inputting the tiles into a trained artificial intelligence model, respectively obtaining a plurality of specified categories corresponding to the plurality of tiles, and setting the specified categories as a plurality of judgment results of the tiles, wherein each of the specified categories is a no-lesion category or one of a plurality of level categories belonging to a same lesion;

counting a number of the specified categories belonging to the no-lesion category and a number of the specified categories belonging to each of the level categories;

determining a lesion level of the lesion based on the number of the specified categories belonging to the no-lesion category and the number of the specified categories belonging to each of the level categories, wherein in response to all the specified categories are no-lesion categories, the lesion level is set to a lowest, in response to the specified categories include different level categories, the lesion level is set according to a severity of each of the level categories; and storing the judgment results and the lesion level as a structured report to be output to a digital pathology platform.

2. The method for image recognition according to claim 1, wherein the step of obtaining the image to be recognized comprises:

obtaining the image to be recognized from an image server in response to receiving an inference request from the digital pathology platform.

3. The method for image recognition according to claim 1, further comprising executing one of the following steps by the processor:

regularly executing the image recognition process based on a preset time; and executing the image recognition process in response to a trigger event.

4. The method for image recognition according to claim 1, wherein the image recognition process further comprises:

after obtaining the image to be recognized and before cutting the image to be recognized, converting a format of the image to be recognized into a specified format.

5. The method for image recognition according to claim 1, wherein the step of storing the judgment results as the structured report comprises:

combining the judgment results of the tiles cut from the image to be recognized to obtain an inference result corresponding to the image to be recognized; and storing the inference result as the structured report.

6. The method for image recognition according to claim 5, wherein each of the judgment results further comprises regional coordinate information, and the step of combining the judgment results of the tiles cut from the image to be recognized to obtain the inference result corresponding to the image to be recognized comprises:

obtaining a lesion area corresponding to the image to be recognized based on the plurality of regional coordinate information in the judgment results.

7. The method for image recognition according to claim 5, wherein the image recognition process further comprises:

displaying the image to be recognized in the digital pathology platform in a form of a heat map based on the inference result, wherein a plurality of pixels included in a recognized lesion area in the image to be recognized are represented by a first color, and a plurality of pixels not included in the lesion area are represented by a second color.

8. The method for image recognition according to claim 1, further comprising: executing a training process on the artificial intelligence model by the processor, wherein the training process comprises:

obtaining a plurality of training images and annotation content corresponding to each of the training images;

cutting each of the training images into a plurality of training tiles, wherein a size of each of the training tiles conforms to the preset size;

classifying the training tiles cut from each of the training images into the specified categories based on the annotation content corresponding to each of the training images; and inputting the training tiles corresponding to the specified categories into the artificial intelligence model for training.

9. The method for image recognition according to claim 8, wherein the training images comprise a plurality of pathological images, and the annotation content of each of the pathological images comprises location information of a pathological area and a pathological label of the pathological area, the step of classifying the training tiles cut from each of the training images into the specified categories based on the annotation content corresponding to each of the training images comprises:

determining whether each of the training tiles covers at least a part of the pathological area;

classifying the training tiles covering at least a part of the pathological area into a pathology category corresponding to the pathological label, wherein the pathology category is one of the specified categories; and classifying the training tiles that do not cover at least a part of the pathological area to the no-lesion category.

10. A system for image recognition, comprising:

a storage device storing a trained artificial intelligence model; and a processor coupled to the storage device and configured to execute an image recognition process, wherein the image recognition process comprises:

obtaining an image to be recognized;

cutting the image to be recognized into a plurality of tiles, wherein a size of each of the tiles conforms to a preset size;

respectively inputting the tiles into the trained artificial intelligence model, respectively obtaining a plurality of specified categories corresponding to the plurality of tiles, and setting the specified categories as a plurality of judgment results of the tiles, wherein each of the specified categories is a no-lesion category or one of a plurality of level categories belonging to a same lesion;

counting a number of the specified categories belonging to the no-lesion category and a number of the specified categories belonging to each of the level categories;

determining a lesion level of the lesion based on the number of the specified categories belonging to the no-lesion category and the number of the specified categories belonging to each of the level categories, wherein in response to all the specified categories are no-lesion categories, the lesion level is set to a lowest, in response to the specified categories include different level categories, the lesion level is set according to a severity of each of the level categories; and storing the judgment results and the lesion level as a structured report to be output to a digital pathology platform.

11. The system for image recognition according to claim 10, wherein the processor is configured to:

obtain the image to be recognized from an image server in response to receiving an inference request from the digital pathology platform.

12. The system for image recognition according to claim 10, wherein the processor is configured to execute one of the following steps:

regularly executing the image recognition process based on a preset time; and executing the image recognition process in response to a trigger event.

13. The system for image recognition according to claim 10, wherein the processor is configured to:

in the image recognition process, after obtaining the image to be recognized and before cutting the image to be recognized, convert a format of the image to be recognized into a specified format.

14. The system for image recognition according to claim 10, wherein the processor is configured to:

in the image recognition process, combine the judgment results of the tiles cut from the image to be recognized to obtain an inference result corresponding to the image to be recognized; and store the inference result as the structured report.

15. The system for image recognition according to claim 14, wherein each of the judgment results further comprises regional coordinate information, and the processor is configured to:

in the image recognition process, obtain a lesion area corresponding to the image to be recognized based on the plurality of regional coordinate information in the judgment results.

16. The system for image recognition according to claim 14, wherein the processor is configured to:

in the image recognition process, display the image to be recognized in the digital pathology platform in a form of a heat map based on the inference result, wherein a plurality of pixels included in a recognized lesion area in the image to be recognized are represented by a first color, and a plurality of pixels not included in the lesion area are represented by a second color.

17. The system for image recognition according to claim 10, wherein the processor is configured to execute a training process on the artificial intelligence model, and the training process comprises:

obtaining a plurality of training images and annotation content corresponding to each of the training images;

cutting each of the training images into a plurality of training tiles, wherein a size of each of the training tiles conforms to the preset size;

classifying the training tiles cut from each of the training images into the specified categories based on the annotation content corresponding to each of the training images; and inputting the training tiles corresponding to the specified categories into the artificial intelligence model for training.

18. The system for image recognition according to claim 17, wherein the training images comprise a plurality of pathological images, and the annotation content of each of the pathological images comprises location information of a pathological area and a pathological label of the pathological area, the processor is configured to:

in the training process, determine whether each of the training tiles covers at least a part of the pathological area;

classify the training tiles covering at least a part of the pathological area into a pathology category corresponding to the pathological label, wherein the pathology category is one of the specified categories; and classify the training tiles that do not cover at least a part of the pathological area to a no-lesion category.

19. A non-transitory computer readable medium, storing a plurality of program instructions, wherein the program instructions are loaded through an electronic device to execute following steps comprising:

obtaining an image to be recognized;

cutting the image to be recognized into a plurality of tiles, wherein a size of each of the tiles conforms to a preset size;

respectively inputting the tiles into a trained artificial intelligence model, respectively obtaining a plurality of specified categories corresponding to the plurality of tiles, and setting the specified categories as a plurality of judgment results of the tiles, wherein each of the specified categories is a no-lesion category or one of a plurality of level categories belonging to a same lesion;

counting a number of the specified categories belonging to the no-lesion category and a number of the specified categories belonging to each of the level categories;

determining a lesion level of the lesion based on the number of the specified categories belonging to the no-lesion category and the number of the specified categories belonging to each of the level categories, wherein in response to all the specified categories are no-lesion categories, the lesion level is set to a lowest, in response to the specified categories include different level categories, the lesion level is set according to a severity of each of the level categories; and storing the judgment results and the lesion level as a structured report to be output to a digital pathology platform.

* * * * *